(12) United States Patent
Woycik et al.

(10) Patent No.: US 11,753,010 B2
(45) Date of Patent: Sep. 12, 2023

(54) SYSTEMS AND METHODS FOR DETERMINING PASSAGE STATUS OF A TRAIN AT A RAILROAD CROSSING

(71) Applicant: Ford Global Technologies, LLC, Dearborn, MI (US)

(72) Inventors: Heather Woycik, Ferndale, MI (US); Kristopher Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 17/487,780

(22) Filed: Sep. 28, 2021

(65) Prior Publication Data

US 2023/0100640 A1 Mar. 30, 2023

(51) Int. Cl.
*B60W 30/18* (2012.01)
*B61L 25/02* (2006.01)
(Continued)

(52) U.S. Cl.
CPC ...... *B60W 30/18009* (2013.01); *B60W 40/04* (2013.01); *B61L 25/025* (2013.01);
(Continued)

(58) Field of Classification Search
CPC .......... B60W 30/18009; B60W 40/04; B60W 2420/42; B60W 2420/52; B60W 2552/00;
(Continued)

(56) References Cited

U.S. PATENT DOCUMENTS 6,179,252 B1 1/2001 Roop et al.
6,416,021 B2 * 7/2002 Greene, Jr. ............. B61L 29/24
246/294
(Continued)

FOREIGN PATENT DOCUMENTS

CN 209987822 U * 1/2020
JP 2005047409 A * 2/2005
(Continued)

OTHER PUBLICATIONS

"How does a grade crossing signal work" Trains Magazine, Forums, general discussion: questions and comments (Year: 2009).*
(Continued)

*Primary Examiner* — Peter D Nolan
*Assistant Examiner* — Tanya C Sienko
(74) *Attorney, Agent, or Firm* — Brandon Hicks; Eversheds Sutherland (US) LLP

(57) ABSTRACT

This disclosure is generally directed to systems and methods for determining a passage status of a train through a railroad crossing. In an example method, a railroad crossing status detector system provided in a vehicle may determine that a train is approaching the railroad crossing. The determination is made by evaluating a first detection signal received from a first train detection apparatus located on one side of the railroad crossing. The railroad crossing status detector system may then evaluate a second detection signal received from a second train detection apparatus located on the other side of the railroad crossing and determine that the train has traveled past the railroad crossing. The system may also evaluate one or both detection signals to determine whether the train is currently located at the railroad crossing or is backing up after traveling at least partway across the railroad crossing.

16 Claims, 5 Drawing Sheets

(51) Int. Cl.
*G01C 21/34* (2006.01)
*B60W 40/04* (2006.01)
*B61L 29/24* (2006.01)
*B61L 29/04* (2006.01)

(52) U.S. Cl.
CPC ..... *G01C 21/3415* (2013.01); *B60W 2420/42* (2013.01); *B60W 2420/52* (2013.01); *B60W 2552/00* (2020.02); *B60W 2556/45* (2020.02); *B61L 29/04* (2013.01); *B61L 29/243* (2013.01)

(58) Field of Classification Search
CPC ... B60W 2556/45; B61L 25/025; B61L 29/04; B61L 29/243; B61L 3/12; G01C 21/3415
See application file for complete search history.

(56) References Cited

U.S. PATENT DOCUMENTS

| | | | | |
|---|---|---|---|---|
| 10,215,573 | B1* | 2/2019 | Hayward | G08G 1/0965 |
| 10,380,904 | B1* | 8/2019 | Hayward | H04W 4/06 |
| 10,392,037 | B2* | 8/2019 | McGavock, Jr. | B61L 23/007 |
| 10,479,333 | B2 | 11/2019 | Weber et al. | |
| 10,899,374 | B2* | 1/2021 | Hilleary | G08G 1/04 |
| 2003/0222981 | A1* | 12/2003 | Kisak | B61L 15/009 |
| | | | | 348/148 |
| 2009/0184214 | A1* | 7/2009 | Reibeling | B61L 29/32 |
| | | | | 246/182 R |
| 2016/0176423 | A1* | 6/2016 | Rude | B61L 25/028 |
| | | | | 246/123 |
| 2016/0200334 | A1 | 7/2016 | Hilleary | |
| 2016/0318530 | A1* | 11/2016 | Johnson | B61L 23/04 |
| 2017/0113707 | A1* | 4/2017 | Ghaly | B61L 23/18 |
| 2018/0170415 | A1* | 6/2018 | Oswald | B61L 25/023 |
| 2018/0222505 | A1* | 8/2018 | Chung | B61L 3/008 |
| 2018/0339718 | A1* | 11/2018 | Hogan | B61L 29/30 |
| 2019/0145791 | A1* | 5/2019 | Rempel | G08G 1/0116 |
| | | | | 701/410 |
| 2019/0300029 | A1* | 10/2019 | Popplewell | B61L 29/32 |
| 2020/0055532 | A1* | 2/2020 | Schultz | B61L 25/028 |

FOREIGN PATENT DOCUMENTS

| | | | | |
|---|---|---|---|---|
| WO | WO-2014064826 | A1 * | 5/2014 | B61L 1/02 |
| WO | WO-2018232129 | A1 * | 12/2018 | |

OTHER PUBLICATIONS

"New Stage in Safety Traffic Control Technologies Development: Digital Railroad Crossing" D. Efanov et al., 2019 International Russian Automation Conference (Year: 2019).*
Machine translation of JP2005047409, downloaded from IP.com (Year: 2023).*
Machine translation of CN-209987822-U, downloaded from IP.com Mar. 24, 2023 (Year: 2023).*
Machine translation of JP-2005047409A, downloaded from IP.com Mar. 23, 2023 (Year: 2023).*
Machine translation of WO2014064826A1, downloaded from IP.com Mar. 23, 2023 (Year: 2023).*
"Automated Level Crossings—A futuristic solution enabling Smart City Infrastructure" K. Saxena (Year: 2019).*
"Intelligent Gateway for Real Time Train Tracking and Railway Crossing Including Emergency Path Using D2D Communication" G.J. Kumar, et al. International Conference on Information, Communication & Embedded Systems (ICICES 2017) (Year: 2017).*
UTCRS "Highway-Rail Crossing Safety Improvements by Diverting Motorist to Alternate Routes" (Oct. 2018).

* cited by examiner

SYSTEMS AND METHODS FOR DETERMINING PASSAGE STATUS OF A TRAIN AT A RAILROAD CROSSING

BACKGROUND

Railroad crossings may pose potential hazards to road users. Some impatient road users may choose to ignore these hazards and attempt to improperly drive across a railway track at a railroad crossing. Other road users may abide by the rules and wait for the railroad crossing to be safe to cross. In some cases, waiting at a railroad crossing may cause an emergency vehicle to be delayed when responding to an emergency, which could have unfortunate consequences. Delays from waiting at railroad crossings may also be inconvenient.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
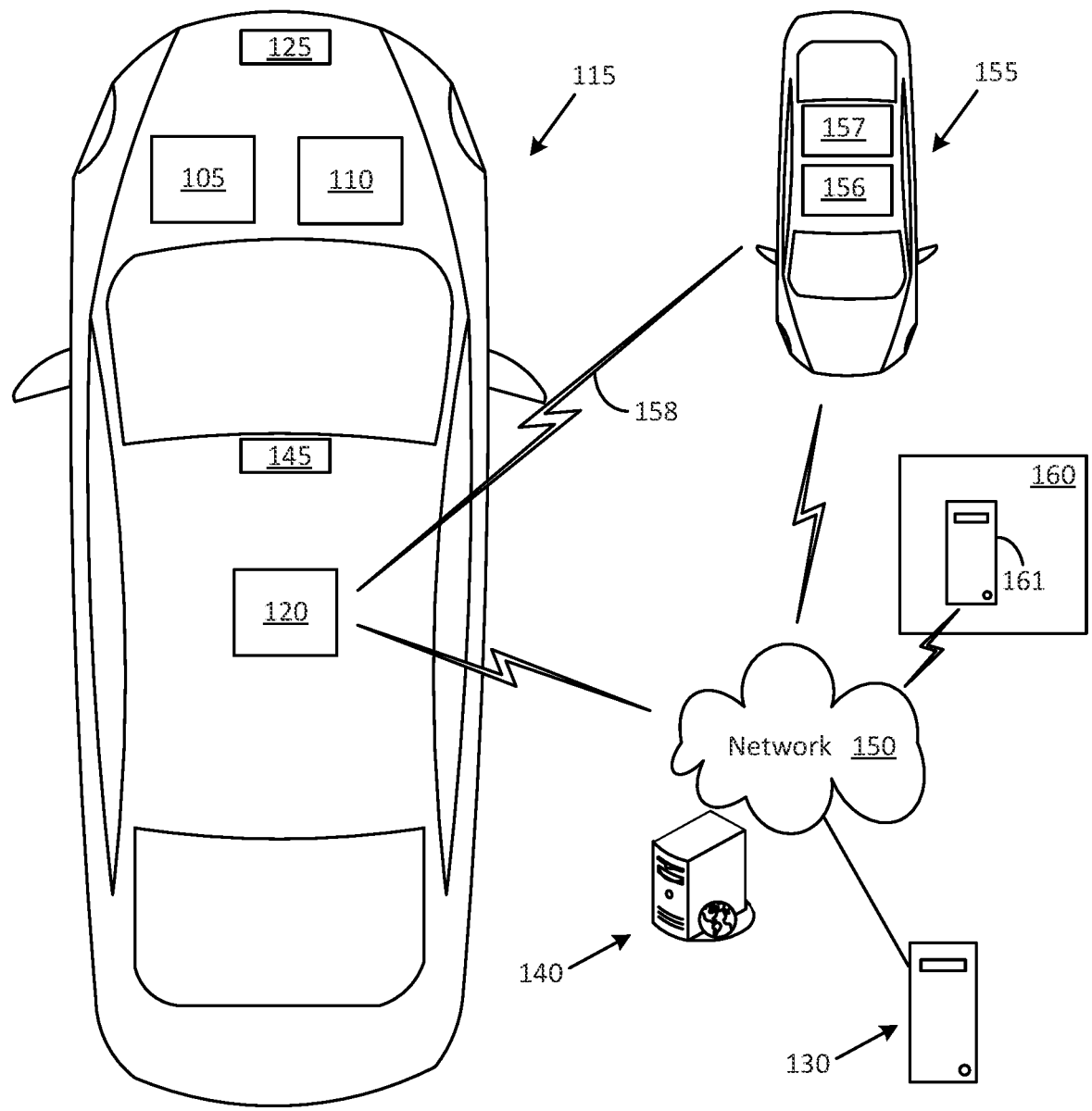
FIG. 1 shows an example vehicle that is configured to determine a passage status of a train through a railroad crossing in accordance with an embodiment of the disclosure.

In terms of a general overview, certain embodiments described in this disclosure are directed to systems and methods related to determining a passage status of a train through a railroad crossing. In an example method, a railroad crossing status detector system provided in a vehicle may determine that a train is approaching the railroad crossing. The determination is made by evaluating a first detection signal received from a first train detection apparatus located on one side of the railroad crossing. The railroad crossing status detector system may then evaluate a second detection signal received from a second train detection apparatus located on the other side of the railroad crossing and determine that the train has traveled past the railroad crossing. The railroad crossing status detector system may also evaluate one or both detection signals to determine whether the train is currently located at the railroad crossing or is backing up after traveling at least partway across the railroad crossing.

Determining that the train is backing up may be done in various ways. In one approach, the railroad crossing status detector system may receive the second detection signal from the second train detection apparatus and determine that the train has traveled past the railroad crossing. The second detection signal may then be followed by another first detection signal received from the first train detection apparatus, which would indicate to the railroad crossing status detector system that the train is backing up. In another approach, the railroad crossing status detector system may receive the first detection signal from the first train detection apparatus two times in a row, which would indicate to the railroad crossing status detector system that the train is backing up after moving partway across the railroad crossing. In yet another approach, the railroad crossing status detector system may evaluate images captured by a camera provided in the vehicle and determine that the train is backing up after traveling past the railroad crossing either partway or completely.

In another example method, a railroad crossing status detector system provided in a vehicle may detect a first object such as, for example, a crossbar or a warning sign, that indicates a safety status of a railroad crossing. The detection may be made out at various times and may include a first period of time ahead of an arrival of a train at the railroad crossing, a second period of time when the train is moving past the railroad crossing, and a third period of time when the train has moved past the railroad crossing. The railroad crossing status detector system may then transmit an advisory to another vehicle (an emergency vehicle, for example) to select an alternate travel route that avoids travel through the railroad crossing during a fourth period of time, which includes at least the first period of time and the second period of time. It is hazardous for any vehicle to move across the railway track at the railroad crossing during the fourth period of time.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, it must be understood that the term "railroad crossing" as used herein refers to any of various types of intersections between a railway track and a road. The road can be a single lane road or a multi-lane road and one or more railways tracks may intersect the road at the railroad crossing. The word "image" as used herein can refer to a single image or to multiple images. In some cases, the multiple images may be contained in a video clip, which can be a real-time video clip. It must also be understood that words such as "implementation," "application," "scenario," "case," and "situation" as used herein are an abbreviated version of the phrase "In an example ("implementation," "application," "scenario," "case," "situation") in accordance with the disclosure." It should be understood that the word "example" as used herein is intended to be non-exclusionary and non-limiting in nature.

FIG. 1 shows an example vehicle 115 that is configured to determine a passage status of a train through a railroad crossing in accordance with an embodiment of the disclosure. The vehicle 115 may be any of various types of vehicles such as a gasoline powered vehicle, an electric vehicle, a hybrid electric vehicle, or an autonomous vehicle, and may include components such as a railroad crossing status detector system 105, a vehicle computer 110, an infotainment system 145, a sensor system 125, and a wireless communication system 120. In an exemplary embodiment, the vehicle 115 is an emergency vehicle, such as a police vehicle, a fire truck, or an ambulance, and it is desirable that the emergency vehicle not be delayed at the railroad crossing when responding to an emergency event.

The vehicle computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The vehicle computer 110 may be communicatively coupled to the railroad crossing status detector system 105 for performing certain operations under advice and/or control of the railroad crossing status detector system 105. Such an arrangement is particularly relevant when the vehicle 115 is an autonomous vehicle.

The infotainment system 145 can be an integrated unit that includes various components such as a radio, streaming audio solutions, and USB access ports for digital audio devices, with elements such as a navigation system that provides navigation instructions to a driver of the car. In an example implementation, the infotainment system 145 has a display that includes a graphical user interface (GUI) for use by a driver of the vehicle 115. The GUI may be used for various purposes such as, for example, to input an advisory for transmitting to a recipient such as a driver of another vehicle or an operator in an emergency operations control center. The display may also be used to display messages and alerts to the driver of the vehicle 115 such as, for example, an alert regarding a train that is approaching a railroad crossing or a safety status of the railroad crossing at various times.

The sensor system 125 can include various types of sensors and detectors that may provide data about various objects located outside the vehicle 115 in accordance with various embodiments of the disclosure. The sensors and detectors may be installed at various locations in the vehicle 115 and can include, for example, one or more cameras, ultrasonic sensors, radar devices, sonar devices, light detection and ranging (LIDAR) devices, and audio detectors (microphones). In an example application, a camera is mounted on a front portion of the vehicle 115 (bumper, grille, dashboard, etc.) and arranged to capture images of objects located in front of the vehicle 115. The objects can include, for example, a crossbar at a railroad crossing, a sign that indicates a railroad crossing nearby, a flashing warning light (red, green, amber), another vehicle ahead of the vehicle 115, a train at a railroad crossing, and/or a train approaching a railroad crossing. A microphone may be arranged to capture sounds produced by various objects such as, for example, a warning bell located near a railroad crossing or a whistle produced by a train approaching a railroad crossing. A radar device may be arranged to capture information (distance, speed, location, etc.) of various objects such as, for example, of a train that is approaching a railroad crossing. In some cases, a sonar device or a LIDAR device may be used in place of, or in addition to, the radar device.

The wireless communication system 120 can include multiple wireless nodes mounted at various locations on the vehicle 115 or a single integrated unit that is mounted for example, in an engine compartment of the vehicle 115, in a trunk of the vehicle 115, in a cabin of the vehicle 115, or on the roof of the vehicle 115. The wireless communication system 120 can be configured to use one or more of various communication technologies to communicate with other entities, such as, for example, with a vehicle 155, a cloud computer 140, and/or a server computer 130.

In an example application, communications between the wireless communication system 120 of the vehicle 115 and a wireless communication system 156 of the vehicle 155 may be carried out over a wireless link 158 using a vehicle-to-vehicle communication protocol and/or via a network 150 using one or more of various communication protocols such as, for example, a Wi-Fi communication protocol or a cellular communication protocol. In an example embodiment, the vehicle 155 is an emergency vehicle such as, for example, a police vehicle, a fire truck, or an ambulance. It is desirable that such vehicles not be delayed at a railroad crossing when responding to an emergency event.

The network 150 may include any one, or a combination of networks, such as, for example, a local area network (LAN), a wide area network (WAN), a telephone network, a cellular network, a cable network, a wireless network, and/or private/public networks such as the Internet. The network 150 may support communication technologies such as, for example, Bluetooth®, cellular, near-field communication (NFC), Wi-Fi, Wi-Fi direct, machine-to-machine communication, and/or man-to-machine communication. At least one portion of the network 150 includes a wireless communication link that allows the cloud computer 140 to communicate with the railroad crossing status detector system 105 via the wireless communication system 120 of the vehicle 115.

The railroad crossing status detector system 105 can include a computer having a processor and a memory. The memory, which is one example of a non-transitory computer-readable medium, may be used to store various code modules. The code modules may be provided in the form of software package containing computer-executable instructions that can be executed by the processor for performing various operations in accordance with the disclosure. A few examples of such operations, which are generally directed at determining a passage status of a train at a railroad crossing and performing associated operations, are described below.

The cloud computer 140 and/or the server computer 130 may include content that is accessible by the railroad crossing status detector system 105 such as, for example, a software package that is downloadable into the railroad crossing status detector system 105, information associated with one or more trains that traverse one or more railroad crossings (such as, for example, timing information, type of train, number of carriages, etc.), railroad crossing infrastructure information (such as, for example, information related to warning signs and lights), and other information such as details about a railway station or train depot located near a railroad crossing. The cloud computer 140 and/or the server computer 130 may also be configured for communicating, transferring, and/or storing information provided by various entities such as, for example, the railroad crossing status detector system 105, a computer 161 in a train depot 160 located near a railroad crossing, and a computer that may be coupled to the wireless communication system 156 of the vehicle 155 (an emergency vehicle, for example).

Figure 2:
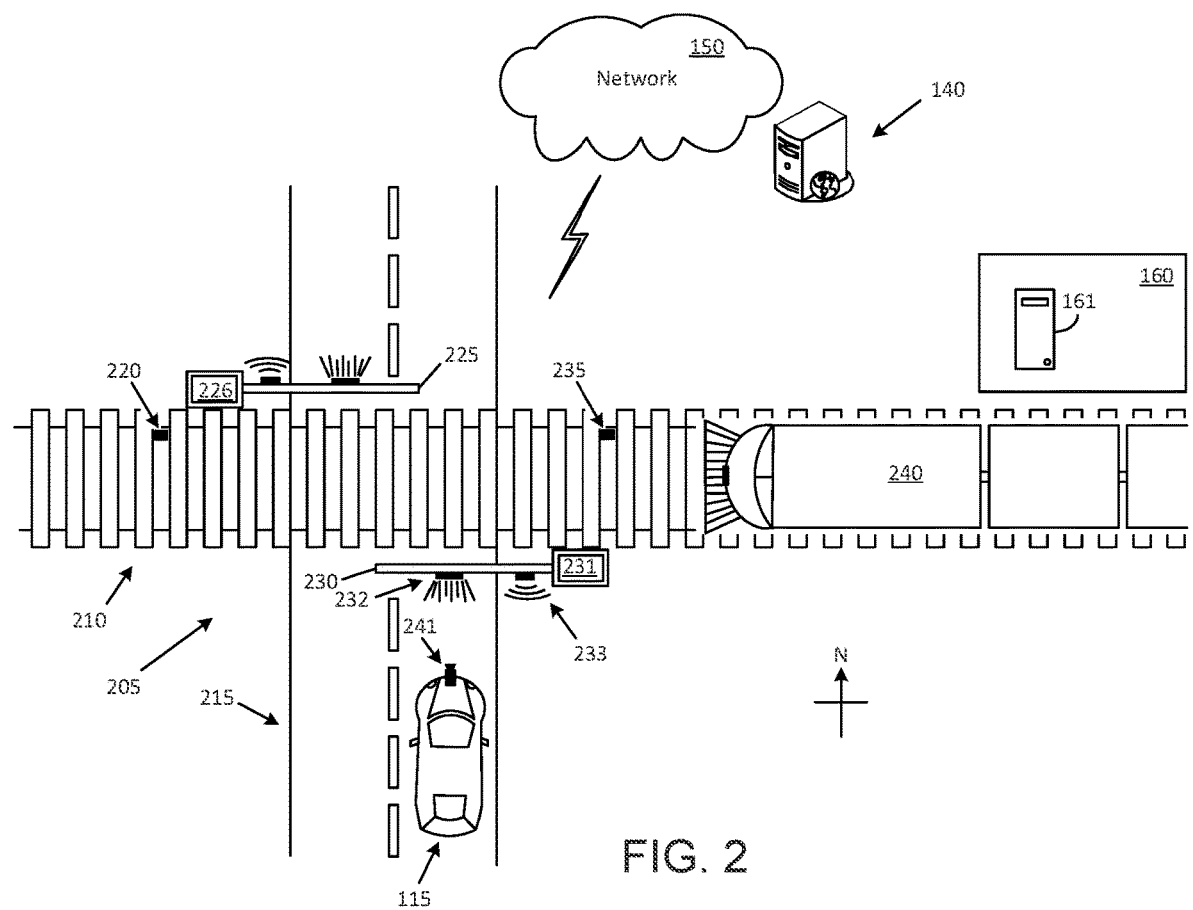
FIG. 2 illustrates an example scenario at a railroad crossing in accordance with an embodiment of the disclosure.

FIG. 2 illustrates an example scenario at a railroad crossing 205 in accordance with an embodiment of the disclosure. In this example scenario, the railroad crossing 205 includes an intersection between a railway track 210 and a road 215. The road 215 is a divided highway through which vehicles can travel in opposite directions. In other scenarios in accordance with the disclosure, two or more railway tracks can intersect various other types of roads such as, for example, a one-lane road or a multi-lane two-way highway.

The vehicle 115 is traveling north and is currently stopped at the railroad crossing 205 as a result of a train 240 that is traveling westwards and is approaching the railroad crossing 205 from the east. The description provided herein is equally applicable to one or more vehicles traveling south on the road 215 and for a train traveling eastwards on the railway track 210 (or on another railway track that intersects the road 215).

Various objects are provided at the railroad crossing 205 in order to warn motorists when approaching the railroad crossing 205. One example object is a crossbar 230 that is deployed (moved from a vertical position to a horizontal position across a portion of the road 215) whenever a train approaches the railroad crossing 205. The crossbar can include, for example, a light unit 232 having one or more lights that flash in any of various colors (red, amber, or green), and can further include an audible alarm source 233 (such as, for example, a bell or an audio transducer that produces a warning sound). A crossbar 225 that is substantially similar to crossbar 230 may provide a warning to motorists traveling south on the road 215.

In an example embodiment, a control unit 231 may be mounted upon, or near, the crossbar 230. It must be understood that the description provided herein with respect to the crossbar 230 (and the control unit 231) is equally pertinent to the crossbar 225 (and the control unit 226). The control unit 231 can include a processor and a memory containing computer-executable instructions that can be executed by the processor for performing various operations in accordance with the disclosure. Some example operations may involve the control unit 231 controlling a deployment of the crossbar 230, activating the light unit 232, and/or activating the audible alarm source 233. These operations may be carried out based on information received from one or more train detecting apparatuses installed on the railway track 210.

Various types of train detecting apparatuses may be used in accordance to the disclosure, such as, for example, a track circuit and an axle counter system. The track circuit may include an electrical circuit having an open-circuit connection that turns into a closed-circuit connection whenever an axle of the train 240 bridges the two rails of the railway track 210 during passage of the train 240 on the railway track 210. The axle counter system may include a counting apparatus that counts the number of axles of the train 240 when the train 240 moves upon the railway track 210.

In the example embodiment shown in FIG. 2, a train detection apparatus 235 is installed on the railway track 210 east of the railroad crossing 205. The train detection apparatus 235 provides an alert to the control unit 231 (and to the control unit 226 of the crossbar 225) upon detecting the train 240 approaching the railroad crossing 205. Another train detection apparatus 220 is installed on the railway track 210 west of the railroad crossing 205. The train detection apparatus 220 provides an alert to the control unit 231 (and to the control unit 226 of the crossbar 225) upon detecting the train 240 having traveled past the railroad crossing 205. The alerts may be provided to the railroad crossing status detector system 105 via a communications system that is coupled to, or is a part of, the control unit 231 (and similarly, the control unit 226). The communications system may employ any one or more of various communication technologies and communication formats such as, for example, Wi-Fi, Wi-Fi direct, and vehicle-to-everything (V2X).

The control unit 231 may also be configured to communicate information pertaining to the crossbar 230 (undeployed, deployed, etc.) to various devices such as, for example, the cloud computer 140, the server computer 130, the computer 161 in the train depot 160, the vehicle computer 110 in the vehicle 115, and/or the railroad crossing status detector system 105. The communications may be carried out via the network 150 in some cases and without use of the network 150 in some other cases (such as, for example, using V2X communications between the control unit 231 and the railroad crossing status detector system 105.) In some applications, the railroad crossing status detector system 105 may receive signals directly from devices (such as the train detection apparatus 235), rather than through the control unit 231.

In a first example embodiment, the railroad crossing status detector system 105 may determine the passage status of the train 240 through the railroad crossing 205 at various times by evaluating information provided by the control unit 231. Based on the evaluation, the railroad crossing status detector system may transmit an advisory to a computer 157 in the vehicle 155 (an emergency vehicle, for example) advising the computer 157 to identify and travel via an alternate travel route in order to avoid crossing the railway track 210 at the railroad crossing 205 during a period of time that spans a first period of time ahead of an arrival of the train 240 at the railroad crossing 205 and a second period of time when the train 240 is moving past the railroad crossing 205.

In one example operational scenario, the train 240 may travel fully past the railroad crossing 205 before reversing and traveling in an opposite direction (eastwards). In this scenario, the control unit 231 of the crossbar 230 and/or the control unit 226 of the crossbar 225 may communicate to the railroad crossing status detector system 105, a signaling sequence that includes a first detection signal generated by the train detection apparatus 235, a second detection signal generated by the train detection apparatus 220, followed by a third detection signal generated by the train detection apparatus 235 once again (when the train 240 is traveling in the reverse direction).

In another example operational scenario, the train 240 may halt at the railroad crossing 205, thereby blocking vehicular traffic on the road 215, before reversing and traveling in an opposite direction (eastwards). In this scenario, the control unit 231 of the crossbar 230 may communicate to the railroad crossing status detector system 105, a signaling sequence that includes a first detection signal generated by the train detection apparatus 235 followed by a second detection signal that is once again generated by the train detection apparatus 235 (when the train 240 is traveling in the reverse direction). In some instances, the railroad crossing may have two or more tracks, which two or more trains traveling in the same or opposite directions.

In either of the two operational scenarios described above (and in various other operational scenarios), the control unit 231 and/or the control unit 226 may provide to the railroad crossing status detector system 105, an indication of a speed of travel of the train 240 in one or both directions. In such an operational scenario, the train detection apparatus 235 (and the train detection apparatus 220) can be an axle counter system that identifies the speed of travel of the train 240 based on the rate at which axles of the train 240 pass over the axle counter system. The speed information may be conveyed by the axle counter system to the control unit 231, which then communicates this information to the railroad crossing status detector system 105. The railroad crossing status detector system 105 may evaluate the speed characteristics of the train 240 to determine that the train 240 is undertaking a reversing operation (slowing down when traveling forwards, stopping, picking up speed when traveling in the reverse direction, etc.).

In addition to using speed as one indication of a reversing operation, another indication that the train 240 may potentially execute a reversing operation may be provided by the presence of the train depot 160 and/or the presence of a branch railway track near the railroad crossing 205. The railroad crossing status detector system 105 may obtain information about the train depot 160 and/or the branch railway track by various means such as, for example, via communications with the computer 161 in the train depot 160 and/or from map information.

In a second example embodiment, the railroad crossing status detector system 105 may determine the passage status of the train 240 through the railroad crossing 205 by evaluating information captured by the sensor system 125 provided in the vehicle 115 (in addition to, or in lieu of, evaluating information provided by the control unit 231). In the example scenario illustrated in FIG. 2, the sensor system 125 includes a camera 241 that is arranged to capture images of objects ahead of the vehicle 115. Images captured by the camera 241 may be evaluated by the railroad crossing status detector system 105 to determine the safety status of the railroad crossing at various times. Evaluation of the images can include detecting a state of the light unit 232. Typically, a green light would provide an indication that it is safe for vehicles to move across the railway track 210 at the railroad crossing 205, an amber light would provide an indication that a train is expected to arrive momentarily at the railroad crossing 205, and a red light would provide an indication that it is hazardous for vehicles to move across the railway track 210 at the railroad crossing 205. The red light may be activated by the control unit 231 in response to receiving a detection signal from the train detection apparatus 235 and/or based on a train schedule provided to the control unit 231.

In another example implementation, the sensor system 125 can include a microphone that detects an audio signal produced by the audible alarm source 233 (a tolling bell sound, for example). The railroad crossing status detector system 105 may evaluate the audio signal at various times in order to determine the passage status of the train 240 through the railroad crossing 205.

Figure 3:
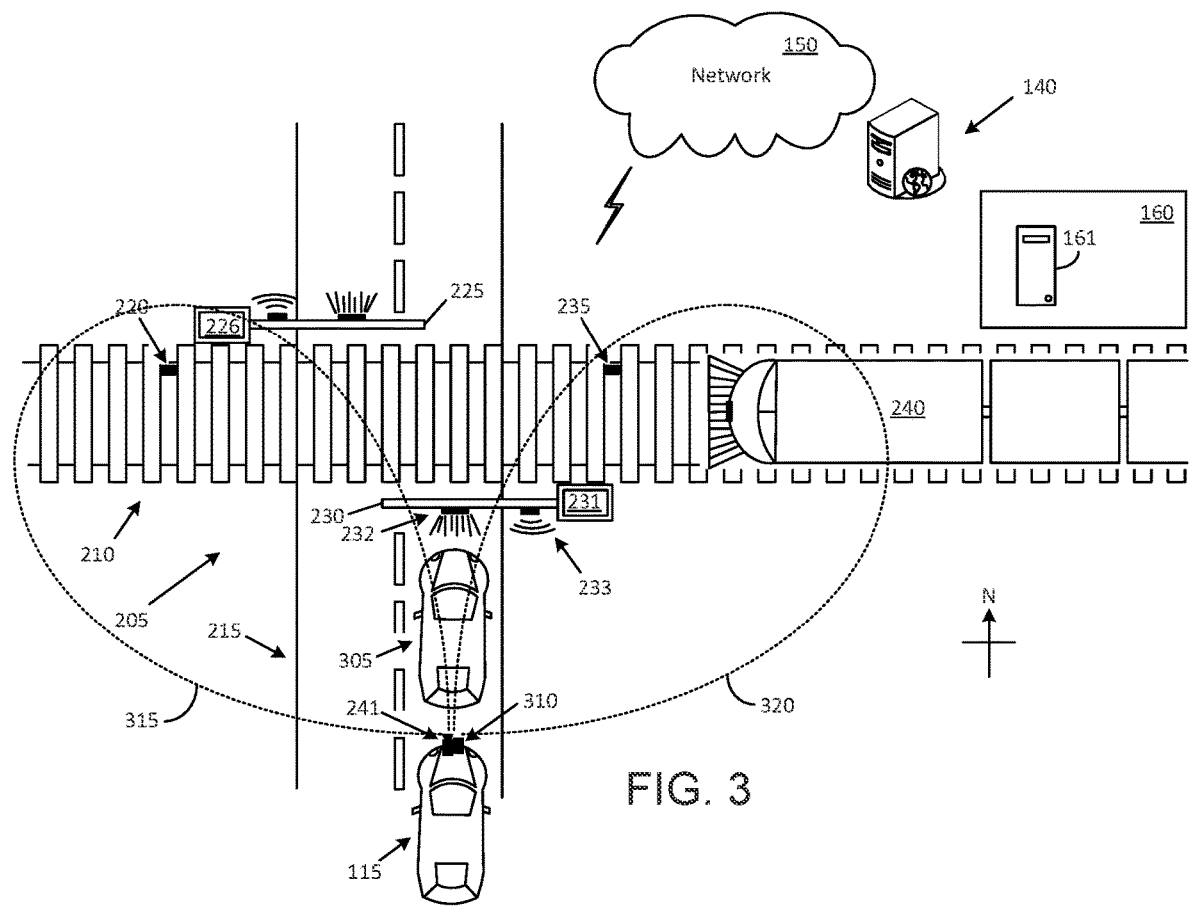
FIG. 3 illustrates another example scenario at a railroad crossing in accordance with an embodiment of the disclosure.

FIG. 3 illustrates another example scenario at the railroad crossing 205 in accordance with an embodiment of the disclosure. In this example scenario, a vehicle 305 is parked ahead of the vehicle 115 at the railroad crossing 205. The vehicle 305 blocks a field of view of the camera 241, thereby preventing the railroad crossing status detector system 105 from obtaining images of the light unit 232 that can be evaluated for determining the safety status of the railroad crossing. In this scenario, the railroad crossing status detector system 105 may utilize a sensor 310 (such as a radar detector or a sonar detector of the sensor system 125) for detecting the train 240. The sensor 310 can include more than one device, such as for example a first radar device mounted near the right headlamp of the vehicle 115 and a second radar device mounted near the left headlamp of the vehicle 115. A radiation pattern of the sensor 310 may include lobes that provide detection of objects in one or both lateral sides of the railroad crossing 205.

In the example configuration shown in FIG. 3, the sensor 310 may radiate a radar signal having a radiation pattern that includes a lobe 315 that provides detection coverage of a western side of the railroad crossing 205 and another lobe 320 that provides detection coverage of an eastern side of the railroad crossing 205.

The train 240 may produce a first radar signal reflection when approaching the railroad crossing 205, and a second radar signal reflection after passing the railroad crossing 205. The railroad crossing status detector system 105 may evaluate these signals to identify a location of the train 240 on either side of the railroad crossing 205, and may use an extrapolation technique to identify a location of the train 240 on the railroad crossing 205. The extrapolation technique may include determining a time period between receiving the first radar signal reflection and receiving the second radar signal reflection.

Figure 4:
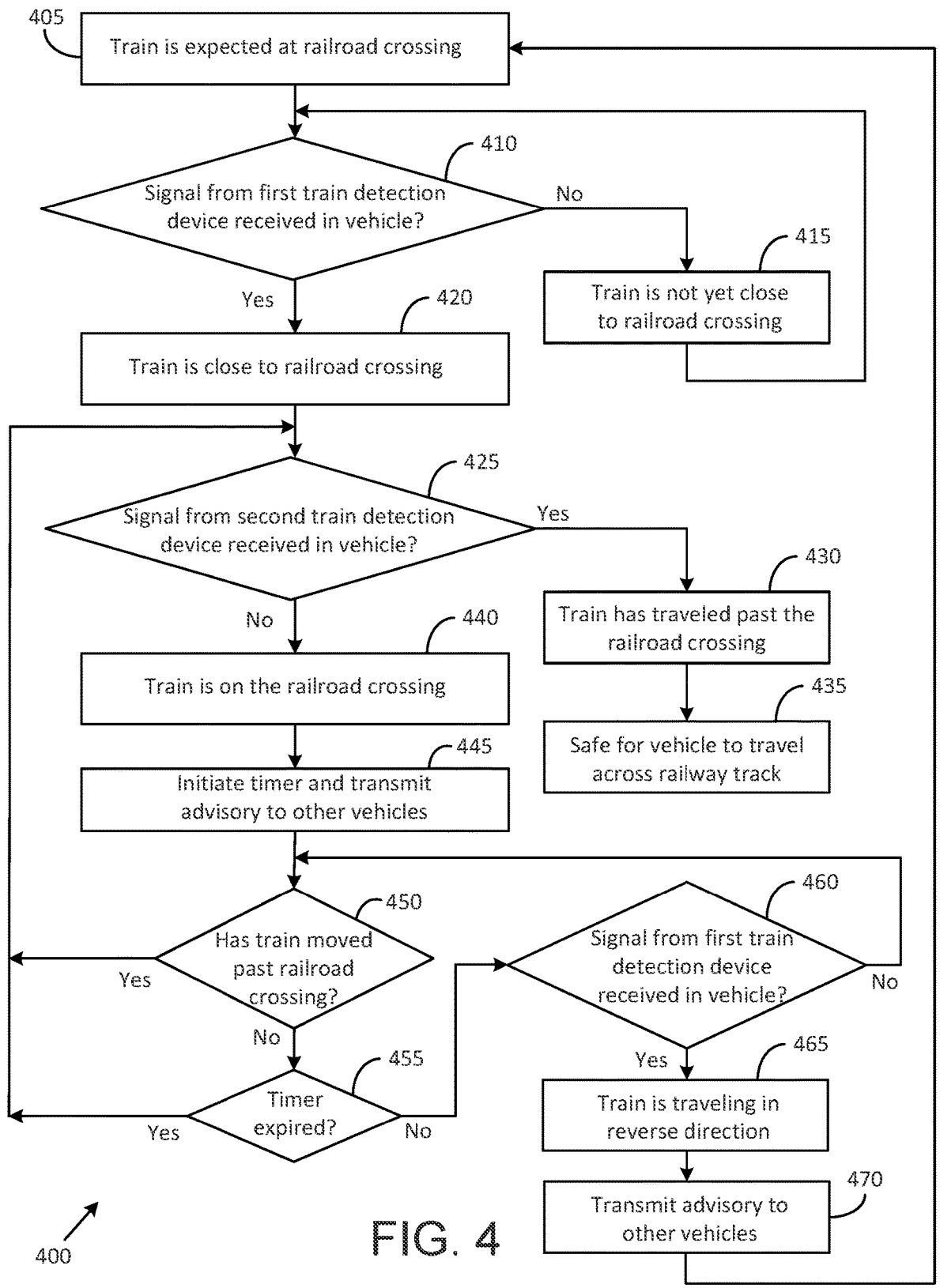
FIG. 4 shows a flowchart of an example procedure to determine a passage status of a train through a railroad crossing in accordance with an embodiment of the disclosure.

FIG. 4 shows a flowchart 400 of an example procedure to determine a passage status of a train through a railroad crossing in accordance with an embodiment of the disclosure. The flowchart 400 illustrates a sequence of operations that can be implemented in hardware, software, or a combination thereof. In the context of software, the operations represent computer-executable instructions stored on one or more non-transitory computer-readable media, that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

Some or all of the operations described in the flowchart 400 may be carried out by the railroad crossing status detector system 105 in cooperation with the control unit 231, the control unit 226, the cloud computer 140, the server computer 130, and/or the computer 161 in the train depot 160. The description below makes reference to certain components and objects shown in FIGS. 1-3, but it should be understood that this is done primarily for purposes of describing certain aspects of the disclosure and that the description is equally applicable to various other embodiments.

At block 405, a train is expected to arrive at a railroad crossing. For example, the railroad crossing status detector system 105 in the vehicle 115 may expect an arrival of the train 240 at the railroad crossing 205 based on various indications such as, for example, based on a signal provided by a microphone of the sensor system 125 in response to detecting a whistle emitted by the train 240 from afar when approaching the railroad crossing 205 and/or a tolling bell sound emitted by the audible alarm source 233. As another example, the train 240 may be expected to arrive at the railroad crossing 205 on the basis of a time table which is accessible by the railroad crossing status detector system 105 and may be stored, for example, in the cloud computer 140 and/or the computer 161 at the train depot 160. As yet another example, the railroad crossing status detector system 105 in the vehicle 115 may expect an arrival of the train 240 at the railroad crossing 205 based on evaluating an image provided by a camera of the sensor system 125. The image may indicate that the crossbar 230 is being deployed and has begun moving from a vertical position to a horizontal position.

At block 410, a determination is made whether a first detection signal produced by a first train detection apparatus has been received in a vehicle. For example, the railroad crossing status detector system 105 in the vehicle 115 may make a determination whether a first detection signal has been received from the train detection apparatus 235 (either directly or via the control unit 231).

If no detection signal has been received, at block 415, it may be recognized that the train is not yet close to the railroad crossing and the action indicated in block 410 is resumed. More particularly, the railroad crossing status detector system 105 in the vehicle 115 may recognize that the train 240 has not yet arrived at the spot where the train detection apparatus 235 is located and await a detection signal from the train detection apparatus 235 (action indicated in block 410).

If a first detection signal has been received, at block 420, it may be recognized that the train is close to the railroad crossing. For example, the railroad crossing status detector system 105 in the vehicle 115 may recognize, upon receiving a detection signal from the train detection apparatus 235, that the train 240 has arrived at the spot where the train detection apparatus 235 is located. In an example scenario, the railroad crossing status detector system 105 may identify the exact location of the train 240 at this time by evaluating an image captured by the camera 241 and/or by evaluating a signal provided by the sensor 310 (a radar sensor or a sonar sensor, for example).

At block 425, a determination is made whether a second detection signal produced by a second train detection apparatus has been received in the vehicle. For example, the railroad crossing status detector system 105 in the vehicle 115 may make a determination whether a second detection signal has been received from the train detection apparatus 220, either directly or via the control unit 226 (or control unit 231).

If a second detection signal has been received, at block 430, it may be recognized that the train has traveled past the railroad crossing. For example, the railroad crossing status detector system 105 in the vehicle 115 may recognize, upon receiving a detection signal from the train detection apparatus 220, that the train 240 has traveled past the railroad crossing 205 and past the spot where the train detection apparatus 235 is located. In an example scenario, the railroad crossing status detector system 105 may confirm that the train 240 has traveled past the railroad crossing by evaluating an image captured by the camera 241 and/or by evaluating a signal provided by the sensor 310 (a radar sensor or a sonar sensor, for example).

At block 435, it is deemed safe for vehicles to move across the railway track at the railroad crossing. For example, the railroad crossing status detector system 105 in the vehicle 115 may recognize that it is safe for the vehicle 115 to cross the railway track 210 at the railroad crossing 205.

If the second detection signal has not been received, at block 440, it may be recognized that the train is on the railroad crossing. More particularly, the railroad crossing status detector system 105 in the vehicle 115 can recognize that the train 240 may be traveling across the road 215 at the railroad crossing 205. In an example scenario, the railroad crossing status detector system 105 may identify the exact location of the train 240 at this time by evaluating an image captured by the camera 241 and/or by evaluating a signal provided by the sensor 310 (a radar sensor or a sonar sensor, for example).

It would be hazardous for any vehicle to cross the railroad crossing 205 at this time and it is desirable that the vehicle 115 (as well as other vehicles) wait until it is safe to travel across the railroad crossing 205 at a later time.

At block 445, a wait time may be selected, and a timer is initiated. The wait time may be determined on the basis of various factors such as, for example, historical wait time data obtained from sources such as, for example, the cloud computer 140 and/or the computer 161, and/or time required to detect whether the train 240 will be moving in a reverse direction (described below with reference to block 460 and subsequent blocks).

Furthermore, at this juncture, the railroad crossing status detector system 105 in the vehicle 115 may take one or more of several actions. In one case, where the vehicle 115 is an autonomous vehicle, the railroad crossing status detector system 105 may cooperate with the vehicle computer 110 in the vehicle 115 to turn the vehicle 115 around (U-turn) and proceed via an alternative route. In another case, the railroad crossing status detector system 105 may transmit an advisory to an emergency operations control center and/or to an emergency vehicle to identify and travel via an alternate travel route in order to avoid the railroad crossing 205.

At block 450, a determination is made whether the train has traveled past the railroad crossing. For example, the railroad crossing status detector system 105 in the vehicle 115 may evaluate an image captured by the camera 241 and/or evaluate a signal provided by the sensor 310 (a radar sensor or a sonar sensor, for example) in order to determine whether the train 240 has fully traveled past the railroad crossing 205 or a rear portion of the train 240 is presently blocking the road 215.

If the train 240 has traveled past the railroad crossing 205, the actions indicated in block 425 and subsequent blocks are executed. However, if the train 240 has not traveled past the railroad crossing 205, at block 455, a determination is made whether the timer has expired. If the timer has expired, the actions indicated in block 425 and subsequent blocks are executed. If the timer has not expired, at block 460, a determination is made whether a second detection signal has been received from the train detection apparatus 235. If no detection signal is received at this time, the actions indicated in block 450 and subsequent blocks are executed.

However, in some scenarios, one or more detection signals may be received. More particularly, in a first example scenario, the train 240 may have moved past the railroad crossing 205 but not traveled past the spot where the train detection apparatus 220 is located. For example, the train 240 may have stopped at the railroad crossing 205 and a rear portion of the train 240 may be presently blocking the road 215. The train 240 may then travel in a reverse direction and move past the spot where the train detection apparatus 235 is located. The railroad crossing status detector system 105 may receive a detection signal from the train detection apparatus 235 and may identify that this detection signal received from the train detection apparatus 235 follows the previous detection signal (referred to in block 410) that was also received from the train detection apparatus 235.

Based on this signal sequence of two detection signals received from the train detection apparatus 235, the railroad crossing status detector system 105 may recognize that the train 240 is traveling in a reverse direction (block 465).

The reverse movement of the train 240 may be preceded by actions such as a slowing down action and a stopping action. Such actions may be detected and evaluated by the railroad crossing status detector system 105 based on images and/or speed information received from the train detection apparatus 235 (an axle counter system).

At this time, at block 470, the railroad crossing status detector system 105 in the vehicle 115 (an emergency vehicle, for example) may transmit an advisory to an emergency operations control center and/or to another vehicle (another emergency vehicle, for example) to identify and travel via an alternate travel route in order to avoid the railroad crossing 205.

In a second example scenario, the train 240 may have moved past the railroad crossing 205 and also past the spot where the train detection apparatus 220 is located. The railroad crossing status detector system 105 receives a detection signal from the train detection apparatus 220 when the train 240 moves past the spot where the train detection apparatus 220 is located. The train 240 may then travel in a reverse direction, move past the railroad crossing 205, and past the spot where the train detection apparatus 235 is located. The railroad crossing status detector system 105 receives a detection signal from the train detection apparatus 235 when the train 240 moves past the spot where the train detection apparatus 235 is located. In total, the railroad crossing status detector system 105 receives a signal sequence of three detection signals when the train 240 reverses a direction of travel—a first detection signal from the train detection apparatus 235 (block 410), a second detection signal from the train detection apparatus 220, and a third detection signal from the train detection apparatus 235 once again (block 460).

Based on this signal sequence of three detection signals, the railroad crossing status detector system 105 may recognize that the train 240 is traveling in a reverse direction (block 465).

The reverse movement of the train 240 may be preceded by actions such as a slowing down action and a stopping action. Such actions may be detected and evaluated by the railroad crossing status detector system 105 based on images and/or speed information received from the train detection apparatus 220 and/or the train detection apparatus 235.

At this time, at block 470, the railroad crossing status detector system 105 in the vehicle 115 (an emergency vehicle, for example) may transmit an advisory to an emergency operations control center and/or to another vehicle (another emergency vehicle, for example) to identify and travel via an alternate travel route in order to avoid the railroad crossing 205. The actions indicated in block 405 and subsequent blocks may be executed after identification of the reverse movement of the train 240 at block 465.

Figure 5:
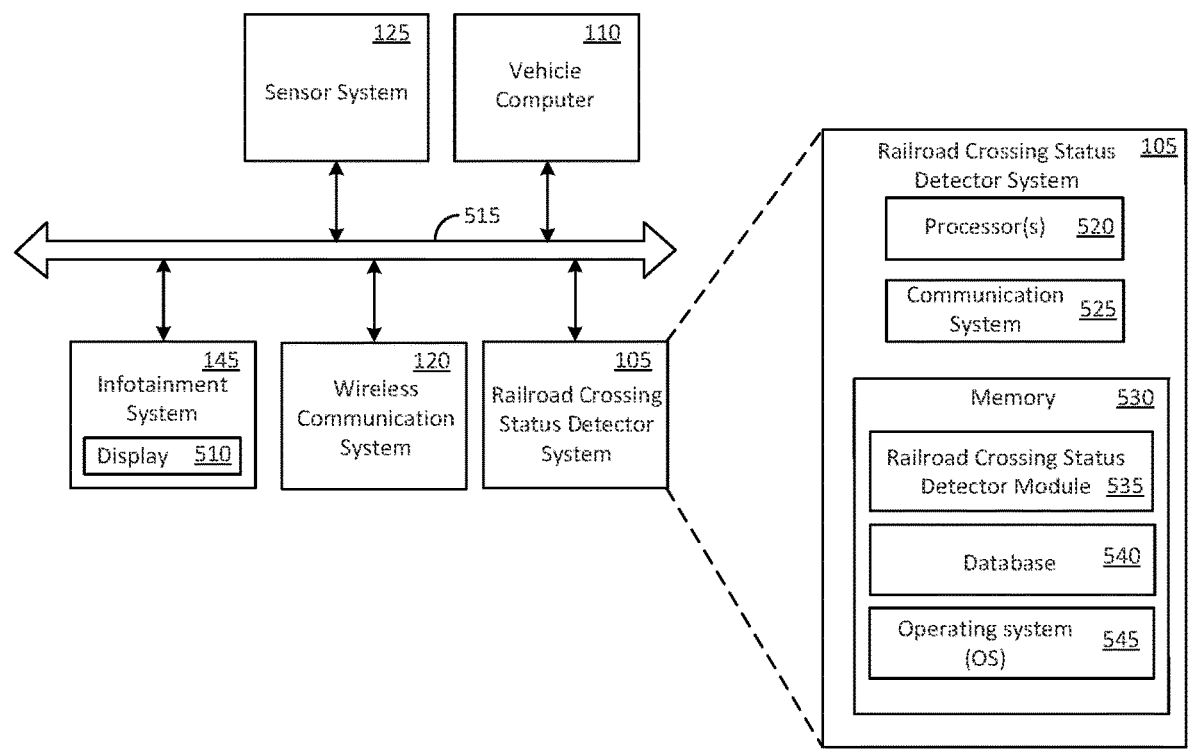
FIG. 5 shows some example components that may be included in a vehicle in accordance with an embodiment of the disclosure.

FIG. 5 shows some example components that may be included in the vehicle 115. The example components may include the sensor system 125, the vehicle computer 110, the infotainment system 145, the wireless communication system 120, and the railroad crossing status detector system 105. The various components are communicatively coupled to each other via one or more buses such as an example bus 515. The bus 515 may be implemented using various wired and/or wireless technologies. For example, the bus 515 can be a vehicle bus that uses a controller area network (CAN) bus protocol, a Media Oriented Systems Transport (MOST) bus protocol, and/or a CAN flexible data (CAN-FD) bus protocol. Some or all portions of the bus 515 may also be implemented using wireless technologies such as Bluetooth®, Bluetooth®, Ultra-Wideband, Wi-Fi, Zigbee®, or near-field-communications (NFC).

The infotainment system 145 can include a display 510 having a GUI for carrying out various operations. The GUI may be used for various purposes such as, for example, to input an advisory for transmitting to a recipient such as, for example, a driver of another vehicle or an operator in an emergency operations control center. The display may also be used to display messages and alerts to the driver of the vehicle 115 such as, for example, an alert regarding a train that is approaching a railroad crossing or a status report of the train.

The sensor system 125 can include various types of sensors such as, for example, the camera 241 and the sensor 310 (a radar sensor, sonar sensor, etc.).

The wireless communication system 120 can include multiple wireless nodes mounted at various locations on the vehicle 115 or a single integrated unit mounted for example, in an engine compartment of the vehicle 115, in a trunk of the vehicle 115, in a cabin of the vehicle 115, or on the roof of the vehicle 115.

The railroad crossing status detector system 105 may include a processor 520, a communication system 525, and a memory 530. The communication system 525 can include one or more wireless transceivers that allow the railroad crossing status detector system 105 to transmit and/or receive various types of information from the cloud computer 140, the server computer 130, the computer 161 in the train depot 160, the control unit 231 in the crossbar 230, and the control unit 226 in the crossbar 225, for example.

The memory 530, which is one example of a non-transitory computer-readable medium, may be used to store an operating system (OS) 545, a database 540, and various code modules such as a railroad crossing status detector module 535. The code modules are provided in the form of computer-executable instructions that can be executed by the processor 520 for performing various operations in accordance with the disclosure.

The railroad crossing status detector module 535 may be executed by the processor 520 for performing various operations related to determining a passage status of a train at a railroad crossing. For example, the railroad crossing status detector module 535 may be executed by the processor 520 for performing various operations indicated in the flowchart 400 shown in FIG. 4. The database 540 may be used to store various types of information such as, for example, train schedules, contact information of entities such as, for example, an emergency operations control center.

It must be understood that even though the various components in FIG. 5 are shown as discrete functional blocks, some of these components, or some parts of these components, may be combined together in some implementations in accordance with the disclosure. For example, in one example implementation, some or all parts of the railroad crossing status detector system 105 may be integrated with the vehicle computer 110.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 530, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, electromagnetic, optical, and/or other types of storage media. In the context of this document, a "non-transitory computer-readable medium" can be, for example but not limited to, an electronic, electromagnetic, optical, electromagnetic, infrared, or semiconductor system, apparatus, or device. More specific examples (a non-exhaustive list) of the computer-readable medium would include the following: a portable computer diskette (electromagnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    detecting, by a first processor in a first vehicle, a first object that indicates a safety status of a railroad crossing at various times, the various times including a first period of time ahead of an arrival of a train at the railroad crossing, a second period of time when the train is moving past the railroad crossing, and a third period of time when the train has moved past the railroad crossing;
    determining, by the first processor, based on the safety status of the railroad crossing at the various times, a fourth period of time during which it is hazardous for the first vehicle to move across a railway track at the railroad crossing, the fourth period of time including at least the first period of time and the second period of time; and
    transmitting, by the first processor, an advisory to a second vehicle to select an alternate travel route that avoids the railroad crossing during the fourth period of time,
    wherein the first object is a crossbar that extends across at least a portion of a road at the railroad crossing, and wherein evaluating the safety status of the railroad crossing comprises the first processor evaluating data provided to the first processor by one of a radar system that is provided in the first vehicle and configured to detect a deployment of the crossbar, a sonar system that is provided in the first vehicle and configured to detect the deployment of the crossbar, or a light detection and ranging (LIDAR) system that is provided in the first vehicle and configured to detect the deployment of the crossbar.

2. The method of claim 1, wherein the first object that indicates the safety status of the railroad crossing is a visual warning sign, and wherein evaluating the safety status comprises the first processor evaluating an image of the first object that is captured by a camera provided in the first vehicle.

3. The method of claim 2, wherein the visual warning sign comprises at least one of a red light, an amber light, or a green light.

4. The method of claim 1, further comprising:
    receiving, by the first processor in the first vehicle, one of a first detection signal or a first signaling sequence comprising the first detection signal followed by a second detection signal, the first detection signal generated by a first train detection apparatus arranged to detect a passage of the train past a first location on a first lateral side of the railroad crossing, the second detection signal generated by a second train detection apparatus arranged to detect the passage of the train past a second location on a second lateral side of the railroad crossing; and
    identifying, by the first processor in the first vehicle, based on evaluating the one of the first detection signal or the first signaling sequence, a presence of the train on one of the first lateral side of the railroad crossing, the second lateral side of the railroad crossing, or on the railroad crossing.

5. The method of claim 4, further comprising:
    receiving, by the first processor in the first vehicle, after receiving of the first signaling sequence, a second signaling sequence comprising the second detection signal followed by the first detection signal; and
    identifying, by the first processor in the first vehicle, based on the second signaling sequence, a reverse movement of the train from the second lateral side of the railroad crossing to the first lateral side of the railroad crossing.

6. The method of claim 1, wherein the second vehicle is an emergency vehicle, and the method further comprises the emergency vehicle identifying and traveling via the alternate travel route in order to avoid crossing the railway track at the railroad crossing during the fourth period of time.

7. A vehicle comprising:
    a communication system;
    a camera configured to capture an image of a first object that provides a visual indication of a safety status of a railroad crossing at various times, the various times including a first period of time ahead of an arrival of a train at the railroad crossing, a second period of time when the train is moving past the railroad crossing, and a third period of time when the train has moved past the railroad crossing;
    a railroad crossing status detector system that includes a computer comprising:
        a memory that stores computer-executable instructions; and
        a processor configured to access the memory and execute the computer-executable instructions to perform operations comprising:
            receiving from the camera, the image of the first object;
            determining, based on evaluating the image of the first object, a fourth period of time during which it is hazardous for the vehicle to move across a railway track at the railroad crossing, the fourth period of time including at least the first period of time and the second period of time; and transmitting, via the communication system, an advisory to another vehicle to select an alternate travel route that avoids the railroad crossing during the fourth period of time, wherein the first object is a crossbar that extends across at least a portion of a road at the railroad crossing, and wherein evaluating the image of the first object comprises detecting a deployment of the crossbar over the fourth period of time.

8. The vehicle of claim 7, further comprising a radar system configured to detect the deployment of the crossbar, a sonar system configured to detect the deployment of the crossbar, and/or a light detection and ranging (LIDAR) system configured to detect the deployment of the crossbar, and wherein the processor is further configured to access the memory and execute additional computer-executable instructions to perform operations comprising:

determining, based on evaluating data provided by the radar system, the sonar system, and/or the LIDAR system, the fourth period of time during which it is hazardous for the vehicle to move across the railway track at the railroad crossing.

9. The vehicle of claim 7, further comprising an audio capture system configured to capture an audible signal emitted by a second object, the audible signal providing an audible indication of the safety status of the railroad crossing at the various times, and wherein the processor is further configured to access the memory and execute additional computer-executable instructions to perform operations comprising:

determining, based on evaluating the audible signal, the fourth period of time during which it is hazardous for the vehicle to move across the railway track at the railroad crossing.

10. The vehicle of claim 9, wherein the second object is one of a bell or a siren that produces the audible signal during at least the first period of time, the second period of time, and the third period of time.

11. The vehicle of claim 9, wherein the processor is further configured to access the memory and execute additional computer-executable instructions to perform operations comprising:

receiving, via the communication system, one of a first detection signal or a first signaling sequence comprising the first detection signal followed by a second detection signal, the first detection signal generated by a first train detection apparatus arranged to detect a passage of the train past a first location on a first lateral side of the railroad crossing, the second detection signal generated by a second train detection apparatus arranged to detect the passage of the train past a second location on a second lateral side of the railroad crossing; and identifying, based on the one of the first detection signal or the first signaling sequence comprising the first detection signal followed by the second detection signal, a presence of the train on one of the first lateral side of the railroad crossing, the second lateral side of the railroad crossing, or on the railroad crossing.

12. A vehicle comprising:
a communication system;
a camera configured to capture an image of a first object that provides a visual indication of a safety status of a railroad crossing at various times, the various times including a first period of time ahead of an arrival of a train at the railroad crossing, a second period of time when the train is moving past the railroad crossing, and a third period of time when the train has moved past the railroad crossing;

an audio capture system configured to capture an audible signal emitted by a second object, the audible signal providing an audible indication of the safety status of the railroad crossing at the various times; and a railroad crossing status detector system that includes a computer comprising:

a memory that stores computer-executable instructions; and a processor configured to access the memory and execute the computer-executable instructions to perform operations comprising:

receiving from the camera, the image of the first object;

determining, based on evaluating the image of the first object, a fourth period of time during which it is hazardous for the vehicle to move across a railway track at the railroad crossing, the fourth period of time including at least the first period of time and the second period of time;

transmitting, via the communication system, an advisory to another vehicle to select an alternate travel route that avoids the railroad crossing during the fourth period of time; and determining, based on evaluating the audible signal, the fourth period of time during which it is hazardous for the vehicle to move across the railway track at the railroad crossing.

13. The vehicle of claim 12, wherein the first object is a crossbar that extends across at least a portion of a road at the railroad crossing, and wherein evaluating the image of the first object comprises detecting a deployment of the crossbar over the fourth period of time.

14. The vehicle of claim 13, further comprising a radar system configured to detect the deployment of the crossbar, a sonar system configured to detect the deployment of the crossbar, and/or a light detection and ranging (LIDAR) system configured to detect the deployment of the crossbar, and wherein the processor is further configured to access the memory and execute additional computer-executable instructions to perform operations comprising:

determining, based on evaluating data provided by the radar system, the sonar system, and/or the LIDAR system, the fourth period of time during which it is hazardous for the vehicle to move across the railway track at the railroad crossing.

15. The vehicle of claim 12, wherein the second object is one of a bell or a siren that produces the audible signal during at least the first period of time, the second period of time, and the third period of time.

16. The vehicle of claim 12, wherein the processor is further configured to access the memory and execute additional computer-executable instructions to perform operations comprising:

receiving, via the communication system, one of a first detection signal or a first signaling sequence comprising the first detection signal followed by a second detection signal, the first detection signal generated by a first train detection apparatus arranged to detect a passage of the train past a first location on a first lateral side of the railroad crossing, the second detection signal generated by a second train detection apparatus arranged to detect the passage of the train past a second location on a second lateral side of the railroad crossing; and identifying, based on the one of the first detection signal or the first signaling sequence comprising the first detection signal followed by the second detection signal, a presence of the train on one of the first lateral side of the railroad crossing, the second lateral side of the railroad crossing, or on the railroad crossing.

\* \* \* \* \*